(12) United States Patent
Yoon et al.

(10) Patent No.: US 8,062,738 B2
(45) Date of Patent: Nov. 22, 2011

(54) HEAT TRANSFER MEDIUM AND HEAT TRANSFER METHOD USING THE SAME

(75) Inventors: Seonmi Yoon, Yongin-si (KR);
Jaeyoung Choi, Suwon-si (KR); Hyeon Jin Shin, Suwon-si (KR); Jeong Gun Lee, Seoul (KR); JongMyeon Park, Seoul (KR)

(73) Assignee: Samsung Electronics Co., Ltd. (KR)

( * ) Notice: Subject to any disclaimer, the term of this patent is extended or adjusted under 35 U.S.C. 154(b) by 196 days.

(21) Appl. No.: 12/124,818

(22) Filed: May 21, 2008

(65) Prior Publication Data

US 2009/0065734 A1  Mar. 12, 2009

(30) Foreign Application Priority Data

Sep. 7, 2007  (KR) .................. 10-2007-0091180

(51) Int. Cl.
*B32B 15/00* (2006.01)
*B32B 17/00* (2006.01)
*B32B 19/00* (2006.01)
(52) U.S. Cl. ..... 428/208; 428/141; 428/143; 428/195.1; 428/426; 428/457; 428/699
(58) Field of Classification Search .................. 428/141, 428/143, 195.1, 208, 426, 457, 699
See application file for complete search history.

(56) References Cited

U.S. PATENT DOCUMENTS

2006/0112858 A1\* 6/2006 Nguyen .................. 106/472
2008/0241262 A1\* 10/2008 Lee et al. ................. 424/490

FOREIGN PATENT DOCUMENTS

KR  1020020060767  7/2002
KR  1020060107835  10/2006

\* cited by examiner

*Primary Examiner* — Gwendolyn Blackwell
(74) *Attorney, Agent, or Firm* — Cantor Colburn LLP

(57) ABSTRACT

Disclosed are a heat transfer medium and a heat transfer method that uses the heat transfer medium. The heat transfer medium comprises a light-transparent substrate coated with a plurality of nano particles. The nano particles absorb light incident thereon to thereby produce heat, which is transferred to a target object to be heated. Nano particles can be applied onto a target object. After heating, the particles are removed by etching. Nano particles can be selectively applied to the light-transparent substrate or directly to a target object to be heat so as to localize heat-production and thus heat selective portions of the target object.

10 Claims, 5 Drawing Sheets

HEAT TRANSFER MEDIUM AND HEAT TRANSFER METHOD USING THE SAME

This application claims priority to Korean Patent Application No. 10-2007-0091180 filed on Sep. 7, 2007, and all the benefits accruing therefrom under 35 U.S.C. §119, the contents of which in its entirety are incorporated herein by reference.

BACKGROUND OF THE INVENTION

This disclosure relates to a heat transfer medium and a heat transfer method that uses the same.

A film formed on a glass or plastic substrate is crosslinked, ordered, plasticized, or crystallized by the application of heat. However, because of differential expansion between the film and the glass or the plastic substrate, fracture of the glass substrate or deformation of the plastic substrate often occurs. In particular, a sintering process that uses high temperature cannot be easily applied to a plastic substrate because inhomogeneous contraction of the substrate occurs.

Further, for example, titanium oxide ($TiO_2$), i.e., a transparent porous electrode material used in a photovoltaic (PV) cell should be sintered at 470° C. Thus, plastic materials cannot be readily used as a substrate for the photovoltaic cell.

SUMMARY OF THE INVENTION

Disclosed herein is a method wherein nano particles of a heat transfer medium can be disposed onto a target device to thereby transfer heat to the target device. Furthermore, in the method, it is possible to apply, as a mask, nano particles onto a infrared transmitting film to transfer heat to a specified portion of a target device to thereby obtain heat transfer effect without leaving unnecessary heat generating material in the device.

In other words, by using heat generated by a surface Plasmon effect in nano particles, breakage or deformation of materials in contact with one another due to differences in thermal expansion can be minimized. This reduction in breakage and deformation is particularly useful in the annealing or sintering processes involving plastic devices.

Disclosed herein therefore is a heat transfer medium and a heat transfer method that uses the heat transfer medium. The heat is transferred by absorbing light in the visible regime or near infrared (NIR) regime. A plurality of nano particles applied onto a film absorb the light by surface Plasmon resonance and generate heat.

When nano particles are applied onto a target object, the particles can be removed by etching, and when a transparent film coated thereon with the nano particles is positioned, as a mask, on a target object requiring heat transfer, and then is exposed to infrared rays, heat is transferred to a specified portion of the target object under the coated nano particles. This technology is very useful for manufacturing plastic devices.

In one embodiment, there is provided a heat transfer medium comprising a film comprising a plurality of nano particles, which absorb light incident to the film to thereby transfer heat to a target object.

In another embodiment, there is provided a heat transfer method using the heat transfer medium, the method comprising the steps of: forming a film comprising a plurality of nano particles; exposing the film with light; and transferring heat to a target object through absorption of light incident to the film by the nano particles.

Herein, the nano particles may be applied directly to the target object, or be applied to an interlayer. Further, the nano particles may be applied to a transparent film such that the film is used as a mask while being positioned on a target object.

In the process of heat transfer using the above construction, the arrangement of the nano particles may be changed so as to transfer heat to a specified portion corresponding to the arrangement. Herein, the film may be exposed to light in the visible regime or NIR regime.

In an embodiment, the transparent film is an infrared (IR) transparent film, and the nano particle is Au, Cu, Ag, Ti, Al, Pd, Pt, Rh, Ir, Fe, W, Ni, or combination thereof.

In yet another embodiment, when nano particles are applied onto a target object, the particles can be removed by etching, and when a transparent film coated thereon with the nano particles is positioned, as a mask, on a target object requiring heat transfer, and then is exposed to infrared rays, heat is transferred to a specified portion of a target object under the coated nano particles.

Such a heat transfer medium is available to a process of annealing an organic film on a plastic. For example, it can be adapted to a semiconductor film (130° C. reordering process) of a channel material and a dielectric (200° C. crosslink process) in an organic thin film transistor (OTFT). Further, it can be adapted to an inorganic film on a plastic, such as for example, a crystallization process (200° C.) of ZnO film, that is a channel material of ZnO TFT, and a crystallization process (350° C.) of Si film, that is a channel material of Si TFT.

Disclosed is a heat transfer medium comprising a substrate and nano particles coated on the substrate, wherein the nano particles produce heat when a light is incident thereon. A surface Plasmon resonance occurs in the nano particles. The light is in the visible regime or NIR regime. The nano particles are formed of Au, Cu, Ag, Ti, Al, Pd, Pt, Rh, Ir, Fe, W, Ni, or a mixture thereof.

Disclosed is a method of heating an object, the method comprising the steps of: exposing nano particles to a light to produce heat; and transferring the heat to the object to be heated. The heat is produced by a surface Plasmon resonance effect in the nano particles. The light is in the visible regime or NIR regime.

BRIEF DESCRIPTION OF THE DRAWINGS

The above and other objects, features and advantages of the disclosed embodiments will be more apparent from the following detailed description taken in conjunction with the accompanying drawings, in which.

DETAILED DESCRIPTION OF THE EXEMPLARY EMBODIMENTS

Figure 1:
FIG. 1 is a view illustrating nano particles coated on an infrared transparent film.

Hereinafter, exemplary embodiments of the present invention will be described in detail.

It will be understood that when an element is referred to as being "on" another element, it can be directly on the other element or intervening elements may be present therebetween. In contrast, when an element is referred to as being "disposed on" or "formed on" another element, the elements are understood to be in at least partial contact with each other, unless otherwise specified.

The terminology used herein is for the purpose of describing particular embodiments only and is not intended to be limiting of the invention. As used herein, the singular forms "a", "an" and "the" are intended to include the plural forms as well, unless the context clearly indicates otherwise. The use of the terms "first", "second", and the like do not imply any particular order but are included to identify individual elements. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

In the drawings, like reference numerals in the drawings denote like elements and the thicknesses of layer and regions are exaggerated for clarity.

FIG. 1 is a view illustrating nano particles coated on an infrared transparent film. As illustrated in FIG. 1, a plurality of nano particles 11 is applied onto a substrate such as the infrared transparent film 10. The substrate is not limited to the infrared transparent film, but may include any material so long as they can transfer heat produced by the nano particles. The infrared transparent film 10 can comprise a plastic or a glass. The film 10 can also be transparent to visible light. The nano particles serve as a mask for heat transfer during manufacturing of a device such as photovoltaic cells.

That is, when the transparent film coated with the nano particles is exposed to light in the visible regime or NIR regime, the nano particles 11 absorb the light to produce the heat in infrared regime (IR heat) by a surface Plasmon resonance effect, and transfer the heat to a target object to be heated. The surface Plasmon resonance occurs in a boundary between a metallic surface and a dielectric such as air or water, due to charge density deviation in-between. A heat transfer medium including the nano particles 11 applied onto the infrared transparent film 10 can be utilized in a heat treatment such as a sintering process, an annealing process, a crystallization process, or the like of plastic or glass substrate used in the infrared transparent film.

Figure 2A:
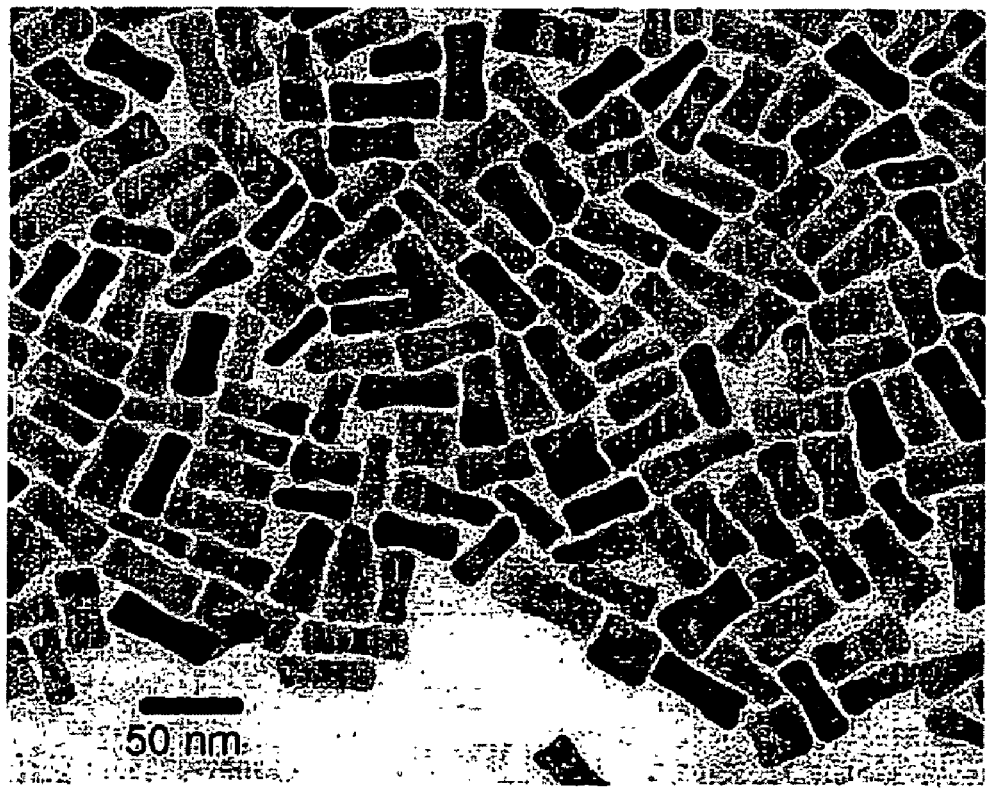
FIG. 2A is a view illustrating the shape of the nano particles comprising gold.

FIG. 2A is a view illustrating the shape of the nano particles comprising gold. In an embodiment, nano particle formed of gold can be applied onto the infrared transparent film. As illustrated in FIG. 2A, nano particles have substantially a uniform size. The size of nano particles can be varied to control the heat transfer.

FIG. 2A illustrates gold nano particles, but the nano particle can be formed of other materials, such as Cu, Ag, Ti, Al, Pd, Pt, Rh, Ir, Fe, W, Ni, or a mixture thereof.

In an embodiment, the nano particles coated on the infrared transparent film may be patterned to thereby localize heat-generation and the heat transfer such that heat is transferred to only a selected portion of the object to be heated. That is, the nano particles are applied to a whole surface or a selective portion of the infrared transparent film where heat transfer is desired, so that the heat transfer can be performed over the whole surface or only on a selected portion.

Figure 2B:
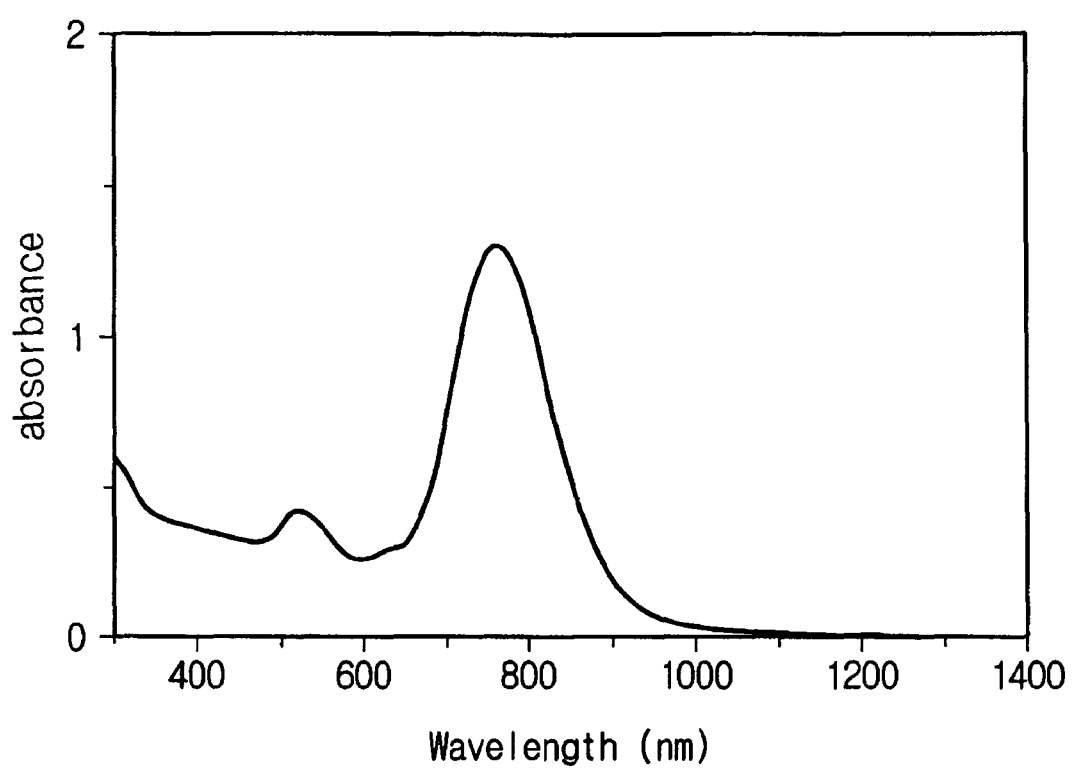
FIG. 2B is a view illustrating an UV-Vis-NIR absorbance spectrum of the nano particles of FIG. 2A.

Referring to FIG. 2B which illustrates a UV-Vis-NIR absorbance spectrum of an aqueous solution in which the gold nano particles of FIG. 2A are dispersed, the maximum absorbance occurs at a wavelength of about 800 nm. The heat transfer can be controlled through a change in the size of the nano particles, depending on a wavelength of light incident on a heat transfer medium.

The gold nano particles used in FIGS. 2A and 2B have a diameter of 10 nm and a length of 60 nm and has maximum absorbance at a wavelength of about 800 nm. Thus, if radiated with an 800 nm wavelength laser, the gold nano particles absorb light and in turn generate infrared heat.

Figure 3:
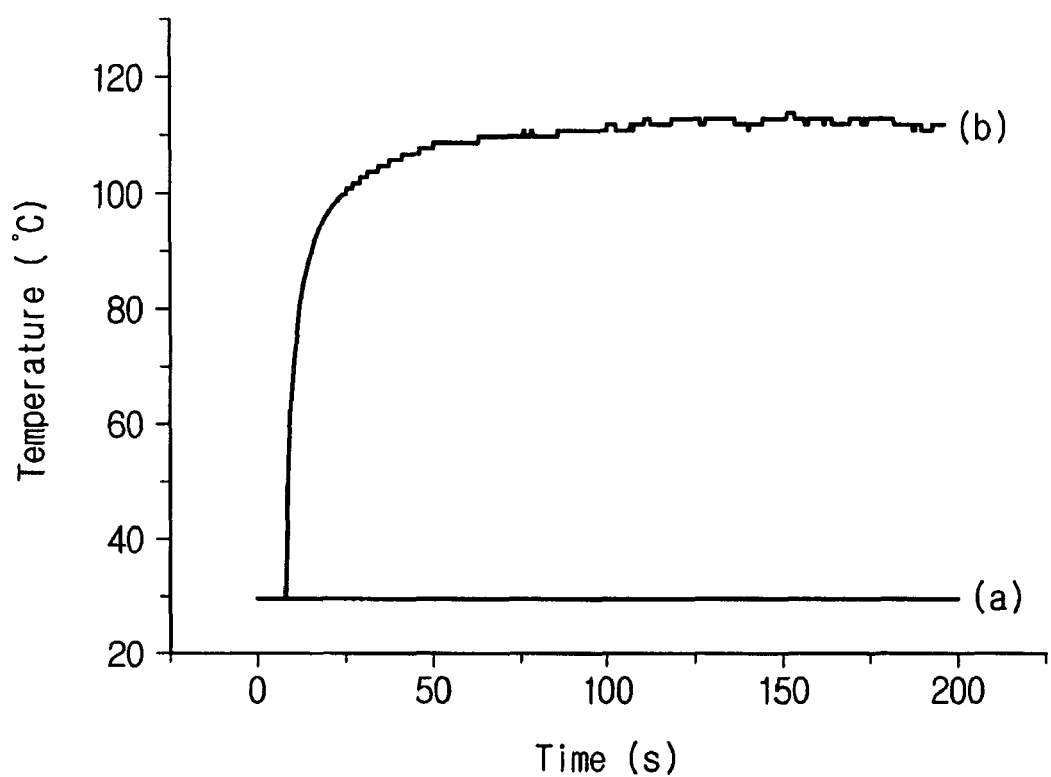
FIG. 3 is a graph illustrating a temperature profile of a substrate when exposed to 800 nm laser at 2 W.

FIG. 3 is a graph illustrating a time-temperature profile when a glass substrate is exposed to an 800 nm laser at 2 W. That is, the curve b in the FIG. 3 is a temperature profile of a glass substrate coated with gold nano particles when exposed to 800 nm laser at 2 W. It can be seen from FIG. 3 that the temperature rises up to about 110° C. in about 50 seconds. On the contrary, in the case of the curve a in which the gold nano particles are not coated on the glass substrate, the substrate does not experience any substantial increase in the temperature.

Figure 4:
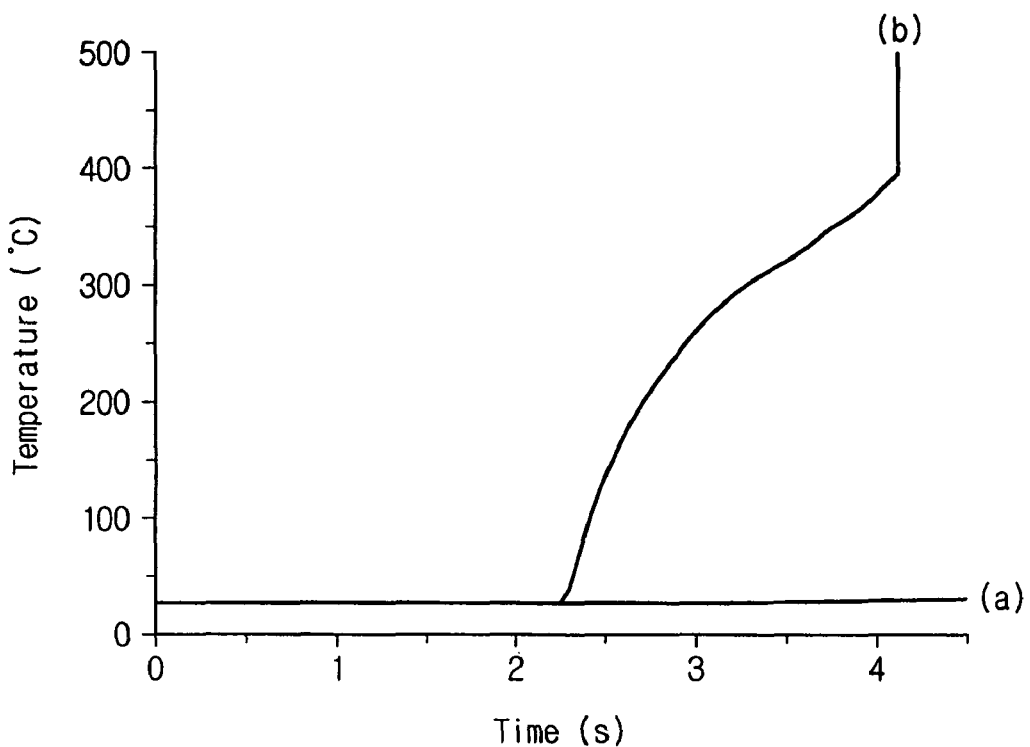
FIG. 4 is a graph illustrating a temperature profile of a substrate when exposed to 800 nm laser at 12 W.

FIG. 4 is a graph illustrating a temperature profile when a glass substrate is exposed to 800 nm laser at 12 W. That is, the curve b is a temperature profile of a glass substrate coated with gold nano particles when exposed to 800 nm laser at 12 W. It can be seen from FIG. 4 that the temperature rises up to about 400° C. in about 4 seconds. On the contrary, in case of the curve a in which the gold nano particles are not coated, the substrate temperature does not substantially rise.

From the graphs of FIGS. 3 and 4, it can be seen that the gold nano particles act as a heat transfer medium because the gold nano particles absorb light incident on the nano particles, i.e., a surface plasmon effect occurs in the gold nano particles. Further, it can also be seen that when the intensity of laser increases from 2 W to 12 W, the temperature elevation occurs in a shorter period of time even at the same wavelength of 800 nm.

Figure 5:
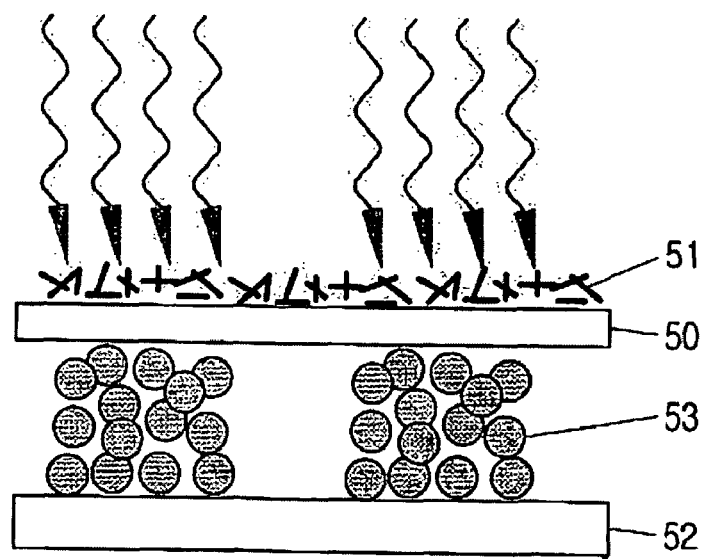
FIG. 5 is a view illustrating an example of a heat transfer medium applied to photovoltaic cells.

FIG. 5 is a view illustrating an example of a heat transfer medium applied to photovoltaic cells. As illustrated in FIG. 5, an infrared transparent film 50 coated with nano particles 51 is positioned, as a mask, on a plastic substrate 52 coated with titanium oxide ($TiO_2$) paste 53 for use in photovoltaic cells. Upon being exposed to an infrared laser, the nano particles generate heat as a result of the Plasmon effect and this heat is transferred through the transparent film 50 to the titanium oxide 53 to sinter the titanium oxide 53. Thus, in the titanium dioxide used in photovoltaic cells can be sintered without causing a deformation in the plastic substrate 52.

Figure 6:
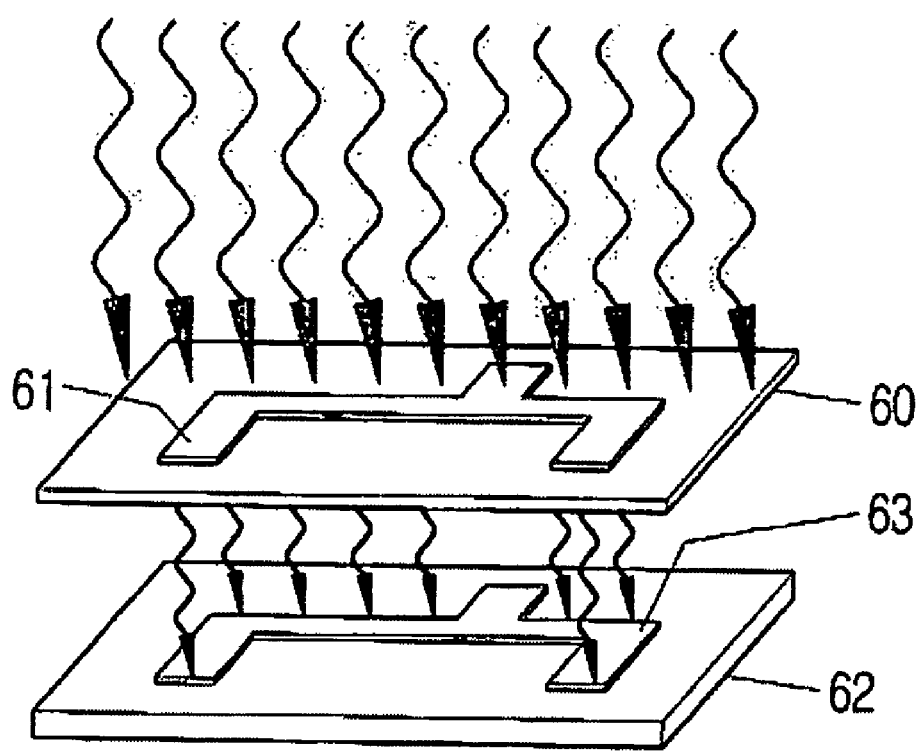
FIG. 6 is a view illustrating an example of a heat transfer medium applied to an annealing process of a device using a plastic substrate.

FIG. 6 is a view illustrating an example of a heat transfer medium applied to an annealing process of a device having a plastic substrate. As illustrated in FIG. 6, a heat transfer medium formed of an infrared transparent film 60 with nano particles 61 selectively disposed thereon is positioned, as a mask, on a plastic substrate 62. When exposed to an infrared laser, the selectively coated nano particles 61 produce heat through the surface Plasmon effect and the heat is transferred to a selected portion 63 of a material placed on the plastic substrate 62, which is placed under the infrared transparent film 60. The remaining portion of the transparent film 60 that is not coated with nano particles permits the infrared rays to pass through and thus is not heated up, thereby not thermally affecting the plastic substrate 62.

That is, as described above, the nano particles can be selectively coated in a patterned form onto the transparent film. Thus, when radiated with a light such as infrared rays, the pattern coated with nano particles can be selectively heated up and the heat is transferred via the transparent film to selectively heat-treat an object corresponding to the pattern. The remaining portions other than the pattern pass the light and are not heated due to absence of nano particles. In this embodiment, the heat treatment may be used to facilitate a sintering process, an annealing process, a crystallization process and the like. In an embodiment, the nano particles can be coated directly on a target object to be treated, for example, in a patterned form on a glass or plastic substrate. The coated nano particles can be removed using an etching process or the like.

While disclosed embodiments have been shown and described with reference to exemplary embodiments thereof, it will be understood by those of ordinary skill in the art that various changes in form and details may be made therein without departing from the spirit and scope of the present invention as defined by the following claims.

In addition, many modifications can be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguished one element from another. Furthermore, the use of the terms a, an, etc. do not denote a limitation of quantity, but rather denote the presence of at least one of the referenced item.

What is claimed is:

1. A heat transfer medium to a target object comprising:
   an infrared (IR) transparent film; and
   a plurality of nano particles disposed on the infrared (IR) transparent film,
   wherein the heat transfer medium is a mask to transfer heat to the target object in a heat treatment process of the target object,
   wherein the nano particles are arranged in a pattern so as to transfer heat to a specified portion corresponding to the pattern,
   wherein the nano particles are effective to absorb incident light; the plurality of nano particles being operative to transfer heat generated by the absorption of light to the target object.

2. The heat transfer medium according to claim 1, wherein the nano particles are applied directly to the target object.

3. The heat transfer medium according to claim 2, wherein the nano particles are removed from the target object by etching after the heat transfer.

4. The heat transfer medium according to claim 1, wherein the nano particles are applied to an interlayer on the target object.

5. The heat transfer medium according to claim 1, wherein the nano particle is Au, Cu, Ag, Ti, Al, Pd, Pt, Rh, Ir, Fe, W, Ni, or combination thereof.

6. The heat transfer medium according to claim 1, wherein the heat transfer is controlled in such a manner that the size of the nano particles is regulated according to a wavelength of incident light such that absorbance has a maximum value at a specified wavelength.

7. The heat transfer medium according to claim 1, wherein the incident light is in the visible regime or NIR regime.

8. The heat transfer medium according to claim 1, wherein the heat transfer medium is used in an annealing process of the film applied to a plastic substrate or a glass substrate; the film being disposed upon the plastic substrate or the glass substrate.

9. The heat transfer medium according to claim 8, wherein the film applied to the plastic substrate or glass substrate comprises an organic material, a metal, a carbon or an inorganic material.

10. The heat transfer medium according to claim 8, wherein the plastic substrate is coated with titanium oxide ($TiO_2$) paste.

* * * * *